Patented July 11, 1933

1,917,815

UNITED STATES PATENT OFFICE

JOHN H. SCHMIDT, OF BLOOMFIELD, AND RUPERT S. DANIELS, OF NEWARK, NEW JERSEY, ASSIGNORS TO BAKELITE CORPORATION, OF NEW YORK, N. Y., A CORPORATION OF DELAWARE

MOLDING MIXTURE AND METHOD OF PREPARING THE SAME

No Drawing. Application filed November 11, 1926. Serial No. 147,841.

This invention is a novel molding mixture prepared by reacting urea or its equivalents and paraformaldehyde (paraform) in presence of filling materials, the latter preferably including both fibrous and non-fibrous components. The invention comprises also the method of preparing such molding mixtures.

It is well known that urea and formaldehyde may be reacted to yield clear resinous products which become infusible when sufficiently heated; but the resins thus formed do not function satisfactorily as binders when admixed with fibrous or other inert fillers, and it has not heretofore been commercially practicable to prepare molding mixtures from these resins. We have found however that this desirable result may be attained by a procedure according to which urea or suitable derivatives thereof and paraformaldehyde are intimately commingled with the filling material, substantially in absence of water and without substantial reaction: thereafter the mixture is sheeted on differential rolls or is subjected to mechanical working by other appropriate devices under conditions to bring about and complete the resin-forming reaction and likewise to vaporize the water arising from this reaction.

Following is an illustrative example in accordance with the invention, which however is not limited to the specific proportions, materials or manipulations set forth by way of illustration.

A suitable mixture comprises by weight:

| | Parts |
|---|---|
| Urea | 110 |
| Paraform | 110 |
| Sulfite fiber | 150 |
| Lithopone | 50 |

Other inert fillers may of course be chosen, and the proportions varied to conform to special requirements. Also, suitable plasticizing agents may be added, as mentioned below.

The mixture is ground in a ball mill or other suitable device until thoroughly pulverized and mixed. Little or no chemical reaction is observed at this stage, which yields a product consisting of the above raw materials in highly pulverized state and in extremely intimate and homogeneous admixture. This product is transferred to differential sheeting rolls which may be of the type commonly used for sheeting rubber or other plastics.

On continued working under these rolls the resin-forming reaction sets in with considerable rise of temperature. Water, which is a by-product of the reaction between urea and paraform, is formed, but is quickly expelled from the sheets at the operating temperature. This operation is continued until the loss of weight corresponds substantially to the water formed in the reaction, indicating not only completion of the reaction but expulsion of the water resulting therefrom, yielding a substantially anhydrous resinous product. Other types of kneading apparatus may of course be substituted for the sheeting rolls mentioned above.

The product now exists in the form of a sheeted and substantially dry mass containing in most intimate admixture the filler and the anhydrous resinous reaction product of urea and paraform. The sheets are preferably broken up and pulverized, yielding the novel molding mixture which is the subject of this invention.

Additional plasticity is imparted to the mixure, when desired, by incorporating with the raw materials, in the ball mill or at a later operating stage, but preferably before the reaction, suitable high-boiling solvents or plasticizing agents; preferably such as are non-volatile or substantially so at the reacting temperature and are also insoluble in water and therefore water-repellant. Suitable solvents for this purpose are the dialkyl esters typified by di-ethyl and di-butyl tartrate or oxalate. Naphthaline or its halogen derivatives may also be used. For certain purposes where a water-repellant mixture is not required ethylene-glycol or the like may be introduced as the plasticizing agent.

Molding mixtures prepared as above, either with or without the plasticizing solvents, are suited for all hot-press molding operations, carried out under essentially the same conditions as in the well-known practice of molding phenol-aldehyde resins. Catalysts may of course be used to accelerate the resin-forming reaction, but their use is not essential.

Instead of urea we may use thio-urea or in general such homologs or derivatives of urea as are equivalent thereto for the purposes of this invention, and the term a urea is used herein to include such equivalents.

We claim:

1. Method of making a molding mixture comprising commingling a urea, paraformaldehyde and a filling material, and thereafter subjecting the mixture to a mechanical working operation until the resin-forming reaction and the expulsion of the by-product water are substantially complete.

2. Method of making a molding mixture comprising commingling a urea, paraformaldehyde, a high boiling solvent for the resulting resin, and a filling material, and thereafter subjecting the mixture to a mechanical working operation until the resin-forming reaction and the expulsion of the by-product water are substantially complete.

3. The herein-described solid molding mixture comprising a filling material in intimate and homogeneous admixture with a substantially anhydrous resinous reaction product of a urea and paraformaldehyde, the said resinous reaction product having been formed in the presence of said filling material by subjecting a mixture of urea, paraformaldehyde and a filling material to a mechanical working operation.

4. The herein-described solid molding mixture comprising a filling material in intimate and homogeneous admixture with a substantially anhydrous resinous reaction product of a urea and paraformaldehyde and a high-boiling solvent for the reaction product, the said resinous reaction product having been formed in the presence of said filling material by subjecting a mixture of urea, paraformaldehyde, a high boiling solvent and a filling material to a mechanical working operation.

In testimony whereof, we affix our signatures.

JOHN H. SCHMIDT.
RUPERT S. DANIELS.